(12) United States Patent
Salter et al.

(10) Patent No.: US 11,801,739 B2
(45) Date of Patent: Oct. 31, 2023

(54) PRIVACY PANEL ASSEMBLY FOR A VEHICLE

(71) Applicant: Ford Global Technologies, LLC, Dearborn, MI (US)

(72) Inventors: Stuart C. Salter, White Lake, MI (US); David Brian Glickman, Southfield, MI (US); Adrian Aguirre, Alvaro Obregon (MX); Micah Jones, Pleasant Ridge, MI (US); Hussein H. Berry, Dearborn, MI (US); Dustin Shedlarski, Commerce Township, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 101 days.

(21) Appl. No.: 17/577,637

(22) Filed: Jan. 18, 2022

(65) Prior Publication Data
US 2023/0226896 A1    Jul. 20, 2023

(51) Int. Cl.
*B60J 9/00* (2006.01)
*B62D 33/027* (2006.01)

(52) U.S. Cl.
CPC .............. *B60J 9/00* (2013.01); *B62D 33/027* (2013.01); *B62D 33/0273* (2013.01)

(58) Field of Classification Search
CPC . B60J 1/2011; B60J 5/101; B60J 5/102; B60J 5/103; B60P 3/341; B62D 33/027; B62D 33/0273
USPC ..................................................... 296/51, 56
See application file for complete search history.

(56) References Cited

U.S. PATENT DOCUMENTS

| | | | | | |
|---|---|---|---|---|---|
| 5,676,414 | A | * | 10/1997 | Hammond | B60J 1/2011 296/165 |
| 5,806,906 | A | * | 9/1998 | Hammond | B60J 1/2011 296/165 |
| 5,820,189 | A | | 10/1998 | Tew | |
| 9,834,951 | B1 | * | 12/2017 | Townley | E04H 15/08 |
| 9,994,089 | B1 | * | 6/2018 | Salter | B60Q 1/2661 |
| 11,060,339 | B2 | | 7/2021 | Ghannam et al. | |
| 11,370,280 | B1 | * | 6/2022 | Salter | B60J 5/107 |
| 11,377,017 | B1 | * | 7/2022 | Yang | B60P 3/39 |

FOREIGN PATENT DOCUMENTS

| | | |
|---|---|---|
| EP | 1167100 A1 | 1/2002 |
| FR | 3040022 A1 | 2/2017 |
| KR | 20130001273 U | 2/2013 |

* cited by examiner

*Primary Examiner* — Jason S Daniels
(74) *Attorney, Agent, or Firm* — Vichit Chea; Carlon, Gaskey & Olds, P.C.

(57) ABSTRACT

A vehicle system, includes an upper liftgate of a split liftgate assembly, a lower liftgate of the split liftgate assembly, and a privacy panel assembly that extends between the upper liftgate and the lower liftgate. Another vehicle system includes a hanger bracket assembly configured to engage at least one hinge assembly of a vehicle, a liftgate assembly pivotably connected to the vehicle, and a privacy panel that is coupled to the hanger bracket assembly and the liftgate. A shielding method includes securing a privacy panel assembly to an upper liftgate of a split liftgate assembly of a vehicle, and securing the privacy panel assembly to a lower liftgate of the split liftgate assembly.

16 Claims, 3 Drawing Sheets

US 11,801,739 B2

PRIVACY PANEL ASSEMBLY FOR A VEHICLE

TECHNICAL FIELD

This disclosure relates generally to a privacy panel that can help to shield and partition areas within and near a vehicle.

BACKGROUND

Vehicles can be used for many things other than transportation. When a vehicle is parked, an individual can sit within a cargo area opening at a rear of the vehicle. These areas are often used as temporary chairs and for storage when tailgating prior to a sporting event or concert or when camping.

SUMMARY

In some aspects, the techniques described herein relate to a vehicle system, including: an upper liftgate of a split liftgate assembly; a lower liftgate of the split liftgate assembly; and a privacy panel assembly that extends between the upper liftgate and the lower liftgate.

In some aspects, the techniques described herein relate to a vehicle system, wherein the privacy panel assembly is secured to the upper liftgate and the lower liftgate.

In some aspects, the techniques described herein relate to a vehicle system, further including a hanger bracket assembly configured to engage at least one hinge assembly that pivotably couples the upper liftgate to a body of a vehicle, the privacy panel assembly additionally secured to the hanger bracket assembly.

In some aspects, the techniques described herein relate to a vehicle system, wherein the privacy panel assembly includes at least one fabric panel.

In some aspects, the techniques described herein relate to a vehicle system, wherein the privacy panel assembly includes a first panel, a second panel, and a plurality of braces sandwiched between the first panel and the second panel.

In some aspects, the techniques described herein relate to a vehicle system, wherein the privacy panel assembly includes at least one vent that permits airflow from a first side of the privacy panel assembly to an opposite, second side of the privacy panel assembly.

In some aspects, the techniques described herein relate to a vehicle system, wherein the at least one vent is covered by a mesh material.

In some aspects, the techniques described herein relate to a vehicle system, further including a pull strap, and a hanger bracket assembly configured to engage at least one hinge assembly that pivotably couples the upper liftgate to a body of a vehicle, the pull strap secured to the hanger bracket assembly.

In some aspects, the techniques described herein relate to a vehicle system, wherein the privacy panel assembly includes portions that stretch.

In some aspects, the techniques described herein relate to a vehicle system, including: a hanger bracket assembly configured to engage at least one hinge assembly of a vehicle; a liftgate assembly pivotably connected to the vehicle; and a privacy panel that is secured to both the hanger bracket assembly and the liftgate.

In some aspects, the techniques described herein relate to a vehicle system, wherein the liftgate is a split liftgate that includes an upper liftgate and a lower liftgate.

In some aspects, the techniques described herein relate to a vehicle system, wherein the privacy panel is disposed alongside an opening to a cargo area of the vehicle on a passenger side or a driver side of the opening.

In some aspects, the techniques described herein relate to a shielding method, including: securing a privacy panel assembly to an upper liftgate of a split liftgate assembly of a vehicle; and securing the privacy panel assembly to a lower liftgate of the split liftgate assembly.

In some aspects, the techniques described herein relate to a shielding method, further including securing the privacy panel assembly to a hanger bracket assembly that is engaged with at least one hinge assembly of the vehicle.

In some aspects, the techniques described herein relate to a shielding method, further including receiving a finger of the hanger bracket assembly within a loop of the privacy panel assembly to secure the hanger bracket assembly from the hanger bracket assembly.

In some aspects, the techniques described herein relate to a shielding method, wherein the upper liftgate is pivotable connected to the vehicle through the at least one hinge assembly.

In some aspects, the techniques described herein relate to a shielding method, further including opening at least one vent to permit a flow of air through the privacy panel assembly.

In some aspects, the techniques described herein relate to a shielding method, further including supporting the privacy panel assembly with a plurality of braces that are disposed between a first panel and a second panel of the privacy panel assembly.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

BRIEF DESCRIPTION OF THE FIGURES

The various features and advantages of the disclosed examples will become apparent to those skilled in the art from the detailed description. The figures that accompany the detailed description can be briefly described as follows.

DETAILED DESCRIPTION

This disclosure details a privacy panel assembly for a vehicle. The privacy panel assembly can be secured relative to the vehicle and used to shield areas within and near the vehicle, such as areas near a rear cargo area of a vehicle. In an example, the privacy panel assembly can be secured relative to the vehicle via a hanger bracket assembly that engages hinge assemblies of the vehicle.

Figure 1:
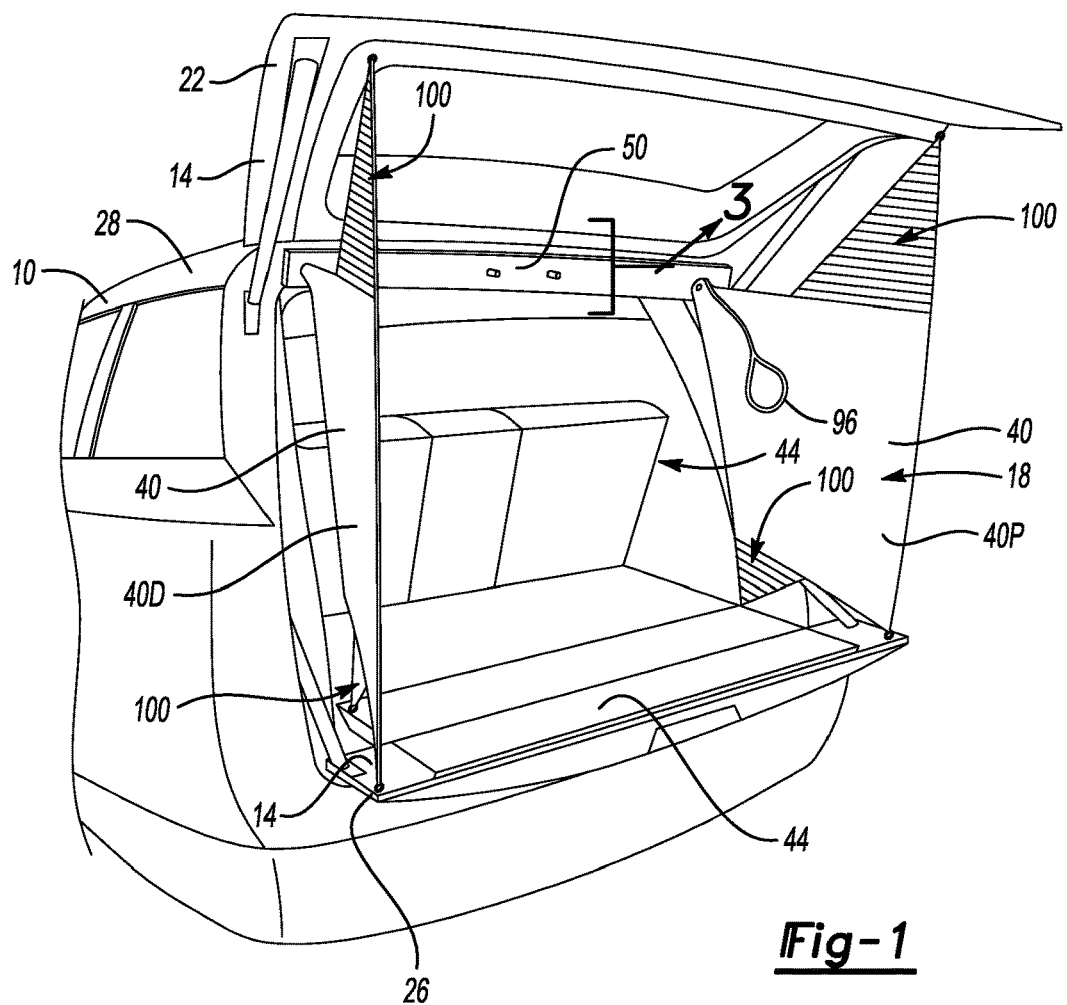
FIG. 1 illustrates a rear perspective view of a vehicle having a split liftgate and a pair of privacy panels.
Figure 2:
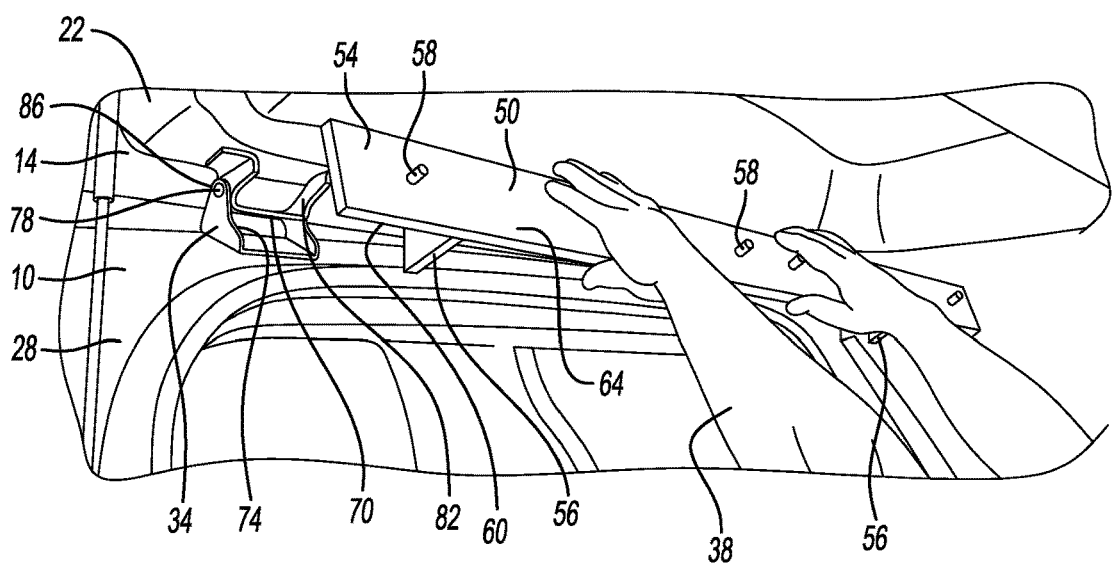
FIG. 2 illustrates a close-up view of an area of the vehicle of FIG. 1 when a hanger bracket assembly is being moved to an engaged position.
Figure 3:
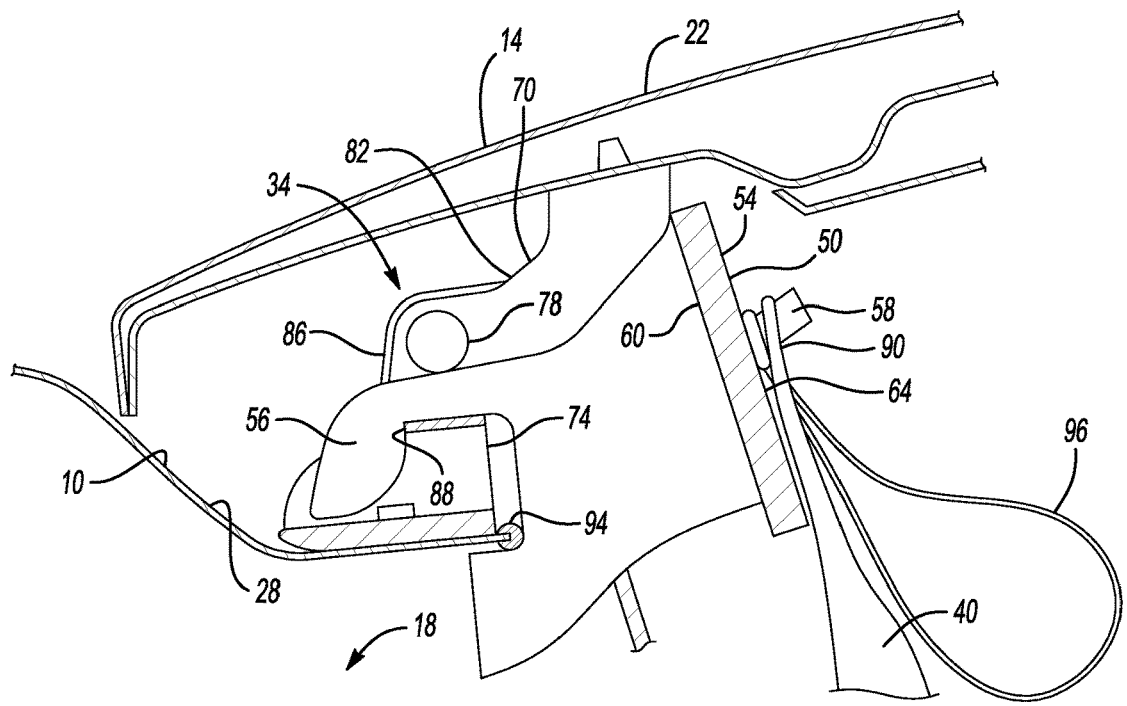
FIG. 3 illustrates a section view taken through line 3-3 in FIG. 1.

With reference to FIGS. 1-3, a vehicle 10 includes a liftgate assembly 14 that can be opened to provide access to a rear cargo area 18 of the vehicle 10. The liftgate assembly 14 is a type of closure panel assembly. The vehicle 10 can include other types of closure panel assemblies, such as side doors and hoods.

The liftgate assembly 14 is a split liftgate assembly that includes an upper liftgate 22 and a lower liftgate 26. The upper liftgate 22 is pivotably connected to a vehicle body 28 of the vehicle 10 using at least one hinge assembly 34. The lower liftgate 26 is pivotably coupled to the vehicle body 28 through other hinge assemblies (not shown). The upper liftgate 22 and lower liftgate 26 can each pivot back and forth between the open position shown and a closed position.

A user 38 can use the lower liftgate 26 in the open positions as a chair. The user 38 may choose to sit on the lower liftgate 26 when the user 38 is observing a sporting event or camping.

In this example, a pair of privacy panel assemblies 40 are used to shield this area of the vehicle 10 from view and to provide a wind break. One of the privacy panel assemblies 40P is disposed alongside an opening 44 to the rear cargo area 18 on a passenger side of the opening 44, the other privacy panel assemblies 40D is disposed alongside the opening 44 on a driver side of the opening 44.

When the privacy panel assemblies 40 are in the installed position shown in FIG. 1, vertically lower portions of the privacy panel assemblies 40 are connected directly to lower liftgate 26, a cargo area floor 42, or both. Vertical, for purposes of this disclosure, is with reference to ground and an orientation of the vehicle 10 during ordinary operation.

Vertically upper portions of the privacy panel assemblies 40 are, in this example, connected to the upper liftgate 22 and additionally connected to a hanger bracket assembly 50. In this example, the hanger bracket assembly 50 is engaged with at least one hinge assembly 34 when the privacy panel assemblies 40 are connected to the hanger bracket assembly 50. The vertically upper portions of the privacy panel assemblies 40 could, in other examples, connect to only the upper liftgate 22 or only the hanger bracket assembly 50.

When not needed, the privacy panel assemblies 40 can be disconnected from the liftgate assembly 14 and the hanger bracket assembly 50. The privacy panel assemblies 40 can then be folded up and stored within the vehicle 10 or elsewhere. The hanger bracket assembly 50 can be disengaged from the at least one hinge assembly 34 and stored within the vehicle 10.

The hanger bracket assembly 50 includes a bar 54, first and second hooks 56, and at least one finger 58. The first and second hooks 56 extend from a first side 60 of the bar 54. The at least one finger 58 extends from an opposite, second side 64 of the bar 54.

The at least one hinge assembly 34 includes, in this example, a passenger side hinge assembly and a driver side hinge assembly. Each hinge assembly 34 includes two hinge brackets and, more specifically, a gate bracket 70 and a body bracket 74. Each hinge assembly 34 additionally includes pins 78 that pivotably connect together the gate bracket 70 to the body bracket 74.

The gate bracket 70 is generally U-shaped and is fastened directly to the upper liftgate 22. The body bracket 74 is generally U-shaped and is fastened directly to the vehicle body 28. The pins 78 pivotably connects legs 82 of the gate bracket 70 to legs 86 of the body bracket 74.

In the exemplary embodiment, to transition the hanger bracket assembly 50 to the engaged position, the user 38 inserts the hooks 56 between the legs 86 of the body bracket 74 until the hooks 56 can contact against an inner side 88 of the gate bracket 70. The user 38 can then release the hanger bracket assembly 50, which is supported by the hooks 56 that are hooked to the hinge brackets At that point, the hanger bracket assembly 50 is engaged with the hinge assemblies 34. The user 38 can then hang the privacy panel assemblies 40 from the fingers 58 of the bracket assembly 50. The privacy panel assemblies 40 in this example, include loops 90 that each receive one of the fingers 58 to connect the vertically upper portions of the privacy panel assemblies 40 to the hanger bracket assembly 50. The loops 90 allow the privacy panel assemblies 40 to hang directly from the fingers 58.

The user 38 then connects the vertically lower portion of the privacy panel assemblies 40 to the floor 42, the lower liftgate 26, or both. The privacy panel assemblies 40 could include loops that connect to hooked features of the floor 42 and the lower liftgate 26 to connect the vertically lower portions of the privacy panel assemblies 40 to these areas.

The user 38 can then sit on the lower liftgate 26 with more privacy than if the privacy panel assemblies 40 were not installed. Further, the privacy panel assemblies 40 protect the user 38 the environment (e.g., snow, rain, etc.).

After the hanger bracket assembly 50 is engaged with the at least one hinge assembly 34, the weight of the hanger bracket assembly 50 helps to keep the hanger bracket assembly 50 engaged. Downward force applied to the fingers 58 can, among other things, tend to drive the bar 54 into a bulb seal 94. The hooks 56 can touch off against various structures of the vehicle 10 when the downward force is applied. The hanger bracket assembly 50 is thus a self-supporting friction-fit structure.

In addition to using the hanger bracket assembly 50 to help secure the privacy panel assemblies 40, the hanger bracket assembly 50 can provide a connection point for a pull strap 96. The user 38 can grasp the pull strap 96 to help the user 38 stand up off of the lower liftgate 26. The pull strap 96 be directly connected to the hanger bracket assembly 50 in some examples. Alternatively, the pull strap 96 could be looped over one of the fingers 58 as shown. The pull strap 96 can be nylon, for example.

The privacy panel assemblies 40, in this example, are fabric. The privacy panel assemblies 40 could be other materials in other examples. The privacy panel assemblies 40 could be, for example, leather, vinyl, cloth. Areas of the privacy panel assemblies 40 could be open mesh for breathability.

In some specific examples, the privacy panel assemblies 40 could be blends of nylons, polyester, rayon, cotton, and/or other wicking fabrics. Materials that are very strong and durable, like ultra-high-molecular-weight polyethylene thread-knits could also be used.

The privacy panel assemblies 40 could incorporate relatively stretchy fabrics, like materials blended or knitted with a small amount of synthetic fibers such as elastane, nylon, etc. Relatively strong and stretchable polyether-based fabrics can be used and are often stretchy and durable.

In this example, the privacy panel assemblies 40 includes portions 100 that are made of relatively stretchy fabrics. Incorporating the portions 100 that stretch allows the privacy panel assemblies 40 to be used with other split liftgate assemblies having upper liftgates and lower liftgates that are further apart or closer together when opened. The portions 100 can stretch to increase a vertical height of the privacy panel assemblies 40.

Figure 4:
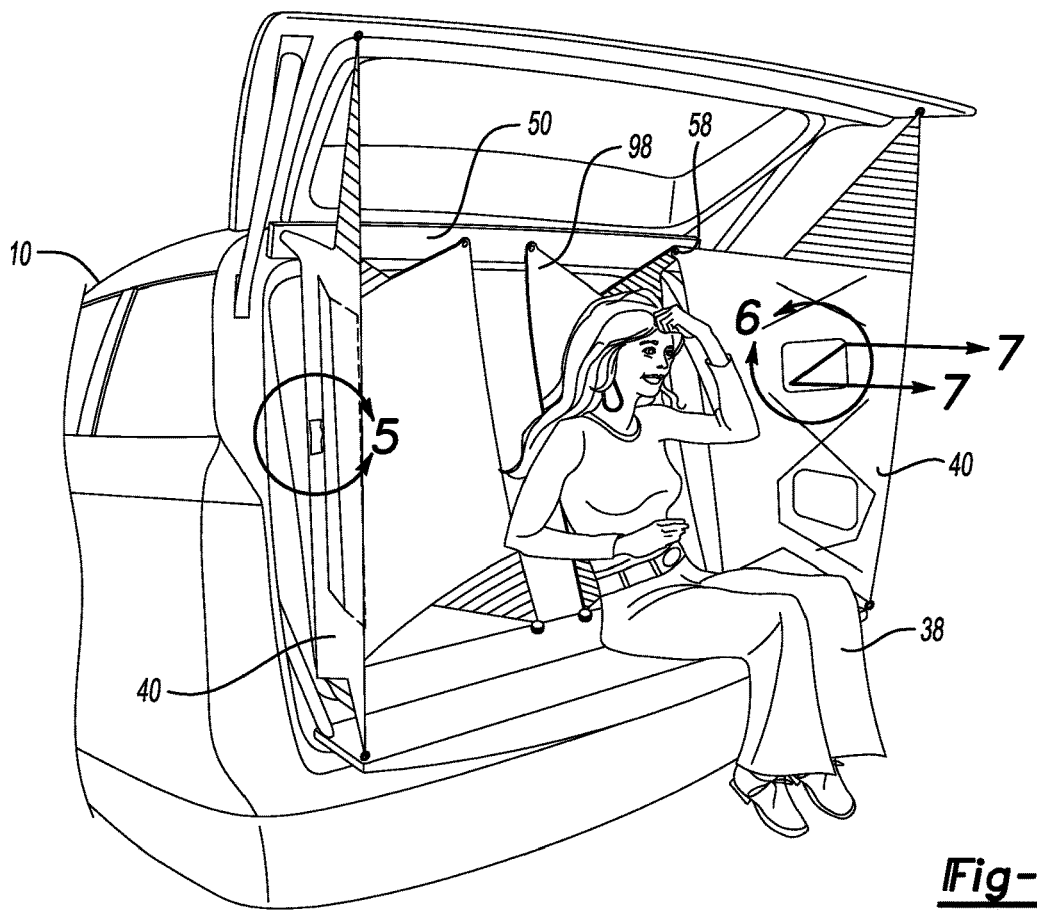
FIG. 4 illustrates the rear perspective view of the vehicle of FIG. 1 showing the privacy panels of FIG. 1 along with chair backs coupled to the hanger bracket assembly.
Figure 5:
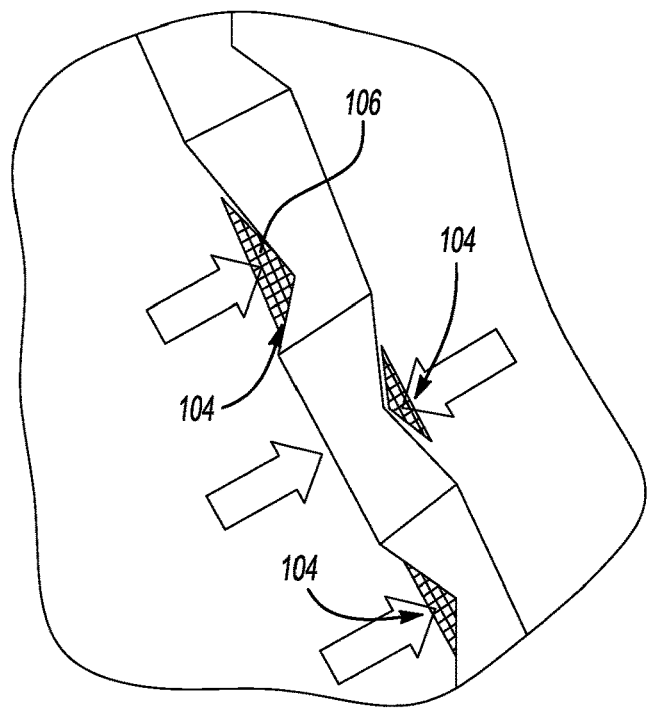
FIG. 5 illustrates a close-up view of a portion of FIG. 4.

Referring to FIGS. 4 and 5, the user 38 is shown on the lower liftgate 26. The user 38 can recline against a chairback 98 that is hung from the hanger bracket assembly 50.

The privacy panel assemblies 40 can include at least one vent 104 that permits a flow of air from a first side of the privacy panel assembly 40 to an opposite, second side of the privacy panel assembly 40. The vents 104 shown in FIG. 5 open in a variety of different directions to catch airflow in different directions.

A mesh material 106 can extend over the vent 104. The mesh material 106 can strengthen area of the privacy panel assemblies 40 near the vents 104 while still permitting airflow through the vents 104. The vents 104 can help to prevent or reduce the privacy panel assemblies 40 flapping in the breeze when the privacy panel assemblies 40 are secured.

Figure 6:
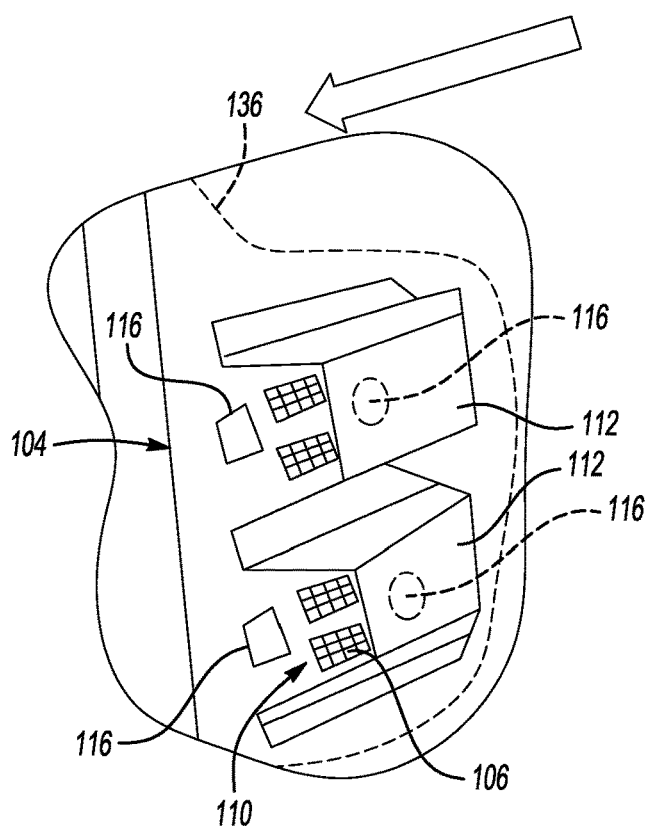
FIG. 6 illustrates a close-up view of another portion of FIG. 4.

The vents 110 detailed in FIG. 6 are near a head of the user 38, can be covered by a plurality of flaps or plackets 112. The user 38 can, for example, secure the plackets 112 over the respective vent 110 in a closed positions. The placket 112 can be held in the closed position using, for example, a hook-and-loop fastener 116. The user 38 can cover the vent 110 with the placket 112 to control ventilation through the vent 110.

Figure 7:
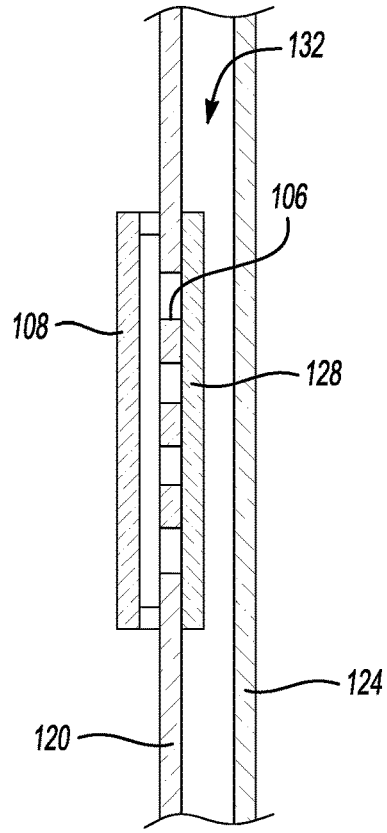
FIG. 7 illustrates a section view taken line 5-5 in FIG. 4.

As shown in FIG. 7, the privacy panel assembly 40, in the exemplary embodiment, includes an inner panel 120 and an outer panel 124. A brace 128 can be sandwiched between the inner panel 120 and the outer panel 124. The brace 128 can be an "X" brace that is expandable and foldable. The brace 128 can fit in the area between the inner panel 120 and the outer panel 124 and can stiffen the privacy panel assembly 40 when in the installed position shown.

The brace 128 can help to prevent or reduce the privacy panel assemblies 40 flapping in the breeze when the privacy panel assemblies 40 are secured.

The vent 110 can direct air into an area 132 between the inner panel 120 and the outer panel 124. Stitching 136 that secures the inner panel 120 to the outer panel 124 can define a chamber that received air within the area 132. Stitching 136 can define the boundaries of the chamber and can direct the air into desired areas.

In some examples, the privacy panel assemblies 40 can be equipped with electro luminescent lighting to provide a decorative feature, or functional feature when tailgating at night. The privacy panel assemblies 40 can also provide a location for attaching games and other accessories. A hook-and-loop dart board could attach to the privacy panel assemblies 40, for example.

The privacy panel assemblies 40 could instead or additionally include pockets for holding drinks, keys, towels, mobile phones, etc. The pockets can be heated or cooled to keep the drinks at a desired temperature, for example.

In some examples, the vehicle 10 can include cameras, sensors, of the or both that can be used to detect whether or not the privacy panel assembly 40 is in the installed position shown. The vehicle 10 may block a closing of the liftgate assembly 14 in response to detecting that the privacy panel assembly 40 is in the installed position.

The preceding description is exemplary rather than limiting in nature. Variations and modifications to the disclosed examples may become apparent to those skilled in the art that do not necessarily depart from the essence of this disclosure. Thus, the scope of protection given to this disclosure can only be determined by studying the following claims.

What is claimed is:

1. A vehicle system, comprising:
   an upper liftgate of a split liftgate assembly;
   a lower liftgate of the split liftgate assembly;
   a privacy panel assembly that extends between the upper liftgate and the lower liftgate; and
   a hanger bracket assembly configured to engage at least one hinge assembly that pivotably couples the upper liftgate to a body of a vehicle, the privacy panel assembly additionally secured to the hanger bracket assembly.

2. The vehicle system of claim 1, wherein the privacy panel assembly is secured to the upper liftgate and the lower liftgate.

3. The vehicle system of claim 1, wherein the privacy panel assembly includes at least one fabric panel.

4. The vehicle system of claim 1, wherein the privacy panel assembly includes a first panel, a second panel, and a plurality of braces sandwiched between the first panel and the second panel.

5. The vehicle system of claim 1, wherein the privacy panel assembly includes at least one vent that permits airflow from a first side of the privacy panel assembly to an opposite, second side of the privacy panel assembly.

6. The vehicle system of claim 5, wherein the at least one vent is covered by a mesh material.

7. The vehicle system of claim 1, further comprising a pull strap, the pull strap secured to the hanger bracket assembly.

8. The vehicle system of claim 1, wherein the privacy panel assembly includes portions that stretch.

9. A vehicle system, comprising:
   a hanger bracket assembly configured to engage at least one hinge assembly of a vehicle;
   a liftgate assembly pivotably connected to the vehicle; and
   a privacy panel that is secured to both the hanger bracket assembly and the liftgate.

10. The vehicle system of claim 9, wherein the liftgate is a split liftgate that includes an upper liftgate and a lower liftgate.

11. The vehicle system of claim 9, wherein the privacy panel is disposed alongside an opening to a cargo area of the vehicle on a passenger side or a driver side of the opening.

12. A shielding method, comprising:
    securing a privacy panel assembly to an upper liftgate of a split liftgate assembly of a vehicle;
    securing the privacy panel assembly to a lower liftgate of the split liftgate assembly; and
    securing the privacy panel assembly to a hanger bracket assembly that is engaged with at least one hinge assembly of the vehicle.

13. The shielding method of claim 12, further comprising receiving a finger of the hanger bracket assembly within a loop of the privacy panel assembly to secure the hanger bracket assembly from the hanger bracket assembly.

14. The shielding method of claim 12, wherein the upper liftgate is pivotable connected to the vehicle through the at least one hinge assembly.

15. The shielding method of claim 12, further comprising opening at least one vent to permit a flow of air through the privacy panel assembly.

16. The shielding method of claim 12, further comprising supporting the privacy panel assembly with a plurality of braces that are disposed between a first panel and a second panel of the privacy panel assembly.

\* \* \* \* \*